United States Patent

Predko

[11] Patent Number: 6,088,787
[45] Date of Patent: Jul. 11, 2000

[54] ENHANCED PROGRAM COUNTER STACK FOR MULTI-TASKING CENTRAL PROCESSING UNIT

[75] Inventor: Myke Predko, North York, Canada

[73] Assignee: Celestica International Inc., North York, Canada

[21] Appl. No.: 09/049,918

[22] Filed: Mar. 30, 1998

[51] Int. Cl.[7] ...................................................... G06F 5/00
[52] U.S. Cl. .......................... 712/202; 712/206; 712/209; 712/225; 712/228; 711/100; 711/132; 709/100; 709/107
[58] Field of Search .................................... 709/100, 107; 711/132, 100; 712/202, 206, 209, 225, 228, 38

[56] References Cited

U.S. PATENT DOCUMENTS

| | | | |
|---|---|---|---|
| 3,614,740 | 10/1971 | Delagi et al. | 712/228 |
| 4,430,707 | 2/1984 | Kim | 709/100 |
| 4,974,157 | 11/1990 | Winfield et al. | 712/202 |
| 4,992,934 | 2/1991 | Portanova et al. | 712/209 |
| 5,034,887 | 7/1991 | Yasui et al. | 364/200 |
| 5,440,749 | 8/1995 | Moore et al. | 712/206 |
| 5,488,688 | 1/1996 | Gonzales et al. | 714/48 |
| 5,640,582 | 6/1997 | Hays et al. | 712/38 |
| 5,696,957 | 12/1997 | Yamaura et al. | 712/228 |
| 5,893,121 | 4/1999 | Ebrahim et al. | 707/206 |

OTHER PUBLICATIONS

PICmicro Mid–Range MCU Family, a manual, Microchip Technology Inc., Chandler, Arizona, 1997, Sections 4,5 & 8.5.

*Primary Examiner*—Meng-Ai T. An
*Assistant Examiner*—Nabil El-Hady
*Attorney, Agent, or Firm*—Blake Cassels & Graydon LLP

[57] ABSTRACT

A central processing unit having at least one memory for storing instructions and data includes a program counter for storing program counter values. An execution unit retrieves and processes instructions located in the memory at addresses corresponding to the contents of the program counter. Multiple stacks independent of the memory are provided for storing program counter values. A multiplexer connects the program counter to each stack. A stack select register connected to a control input of the multiplexer enables the transfer of program counter values between the program counter and one of the stacks indicated by the contents of the stack select register. The central processing unit provides an efficient multi-tasking capability since the program counter state of each task can be stored in one of the multiple stacks.

16 Claims, 3 Drawing Sheets

ENHANCED PROGRAM COUNTER STACK FOR MULTI-TASKING CENTRAL PROCESSING UNIT

FIELD OF INVENTION

The invention relates generally to the structure of a central processing unit and more specifically to an enhanced microprocessor program counter stack for providing efficient multi-tasking capability.

BACKGROUND OF INVENTION

Central processing units such as microprocessors typically employ a program counter to indicate the memory address of the next instruction to be executed in a program sequence. The instruction referenced by the value or contents of the program counter is retrieved from memory and typically transferred to an instruction register for subsequent decoding and execution. After each instruction is retrieved from memory, the program counter is typically automatically incremented so that it references the following instruction in the program sequence or instruction thread.

Some instructions, such as subroutine calls, deviate from the default sequential instruction flow and require that the program counter be modified to point to the starting address of the first instruction of the subroutine. At the end of the subroutine, the program counter contents must be restored to contain the address of the next instruction to be executed from the calling instruction thread. This is accomplished by storing or pushing the contents of the program counter onto a last-in first-out (LIFO) stack at the beginning of a subroutine, and retrieving or pulling the saved program counter value from the stack at the end of the subroutine, when a return-from-subroutine instruction is encountered. The stack also enables subroutines to be nested.

The stack, which is a memory construct, may be implemented as an independent, hard-wired, series of interconnected LIFO registers. An example of such a hardwired stack is found in the PICmicro™ microcontroller manufactured by Microchip Technology Inc., of Chandler, Ariz. Alternatively, the LIFO stack can be implemented in a general random access memory, in which case a stack pointer register (or dedicated general memory location) is typically needed to keep track of the top of the stack.

The conventional practice of providing a program counter and associated stack for controlling program flow results in various inefficiencies when the microprocessor is required to execute multiple processes or tasks, i.e. multi-tasking, by time slicing usage of the microprocessor amongst the various tasks. The time slicing is typically administered by a core software program, often referred to as a "kernel", which typically has to save the state of the program counter and its associated stack every time the kernel temporarily terminates the execution of a given task. Later, the kernel has to restore the saved state of the program counter and its associated stack when the time comes to continue the execution of the given task. This set of events represents inefficient overhead in the sense that many memory accesses may be required to transfer the contents of multiple copies of the program counter stacks merely to switch tasks.

For example, the above mentioned PICmicro™ microprocessor suffers from this problem. This microprocessor exhibits a Harvard-type architecture, meaning that the program memory and data memory are physically distinct and accessed from different buses, thereby allowing an instruction to be executed while another instruction is being fetched. As is not atypical in Harvard-type architectures, the instruction length and instruction address bus is wider than the data length and data bus. (Specifically, the PICmicro™ has a thirteen bit wide instruction address bus to accommodate an 8K program memory and an eight bit wide data bus.) Thus, the program counter and its associated hardwired LIFO stack require two instruction cycles to transfer each entry in the program counter and associated stack to the data memory in order to store the program counter state of a given task. This is quite wasteful of processor resources.

SUMMARY OF INVENTION

The central processing unit may further have a decoder connected to the stack select register and to a control input for each stack in order to control the transfer of data between each stack and the program counter.

The stack may have a last-in, first-out memory structure.

In the central processing unit the at least one memory may comprise a separate program memory unit and a separate data memory unit. The program memory unit may be connected to the execution unit by an instruction bus and the data memory unit may be connected to the execution unit by a data bus.

The invention seeks to improve the multi-tasking capability of central processing units such as those found in low cost microprocessors. Broadly speaking, the invention presents a central processing unit having a program counter connected to multiple program counter stacks and a means for selecting which of the various program counter stacks the program counter is set to read and write from. In this manner, multi-tasking can be more efficiently accomplished by selecting the use of one of the program counter stacks in association with a given task.

According to one aspect of the invention, a central processing unit (CPU) is provided. The CPU comprises at least one memory for storing instructions and data, and a program counter for storing a program counter value. An execution unit is connected to the memory for retrieving and processing an instruction located in the memory at an address corresponding to the program counter value. A plurality of stacks (independent of the memory) are provided for storing program counter values. A multiplexer connects the program counter to each of the stacks, and a stack select register is connected to a control input of the multiplexer. The stack select register enables the transfer of program counter values between the program counter and the stack indicated by the stack select register.

BRIEF DESCRIPTION OF DRAWINGS

These and other aspects of the invention are described in greater detail with reference to the following drawings, provided for the purposes of description and not of limitation, wherein.

DETAILED DESCRIPTION OF PREFERRED EMBODIMENTS

Figure 1:
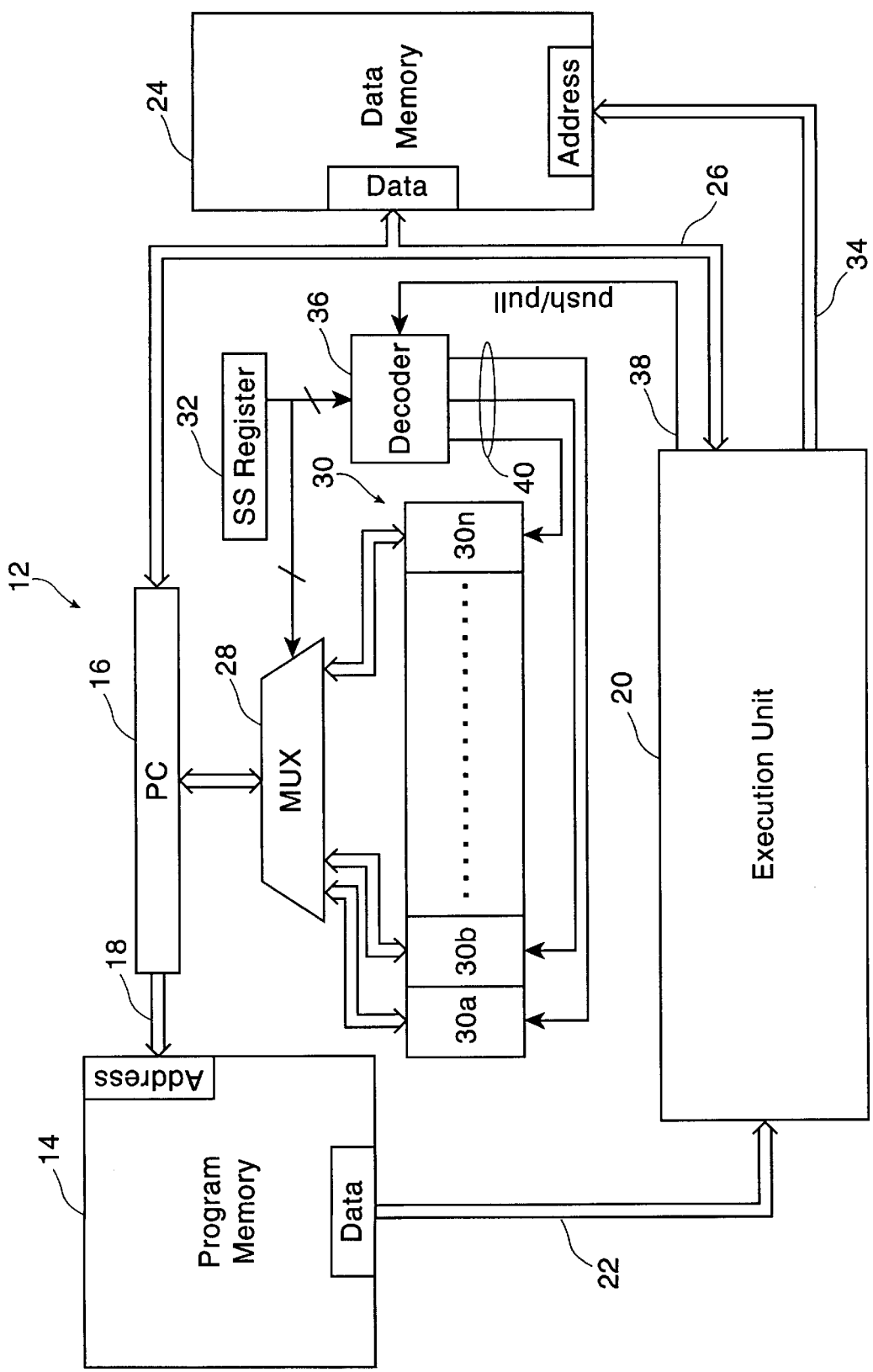
FIG. 1 is a block diagram illustration of a Harvard-type microprocessor having multiple program counter stacks in accordance with the preferred embodiment.

FIG. 1 is a simplified block diagram of a Harvard-type microprocessor 12. The microprocessor comprises a program memory 14 which stores microprocessor instructions associated with one or more processes or tasks. The program memory 14 is connected to a program counter (PC) 16 via an instruction address bus 18. The program memory 14 is also connected to an execution unit 20 via an instruction bus 22. The execution unit 20 comprises various components (not shown), including an arithmetic logic unit, an instruction queue, internal registers, status registers, timers and clocks. The execution unit 20 also includes an instruction decoder and control module, e.g., microcode execution module, which enables the execution unit 20 to decode and execute native microprocessor instructions.

The execution unit 20 is connected to a data memory 24 via a bidirectional data bus 26 in order to enable the transfer of data therebetween. The data bus 26 also connects the program counter 16 to the execution unit 20. In addition, a data address bus 34 is disposed between the execution unit 20 and data memory 24. The execution unit 20 uses the data address bus 34 to provide the address or location for a read or write operation from or to the data memory 24. (In this manner, the microprocessor 12 features a Harvard architecture having separate instruction and data buses.)

The program counter 16 is additionally connected to one side of a multiplexer 28. The other side of the multiplexer 28 is connected to the data inputs of a stack array 30 which is organized into a plurality of last in, first out (LIFO) stacks, indicated in FIG. 1 by reference numerals 30a, 30b, . . . , 30n. Thus, the multiplexer 28, as known in the art, provides a bi-directional data path connecting each stack 30a, 30b, . . . , 30n in the stack array 30 to the program counter 16.

The stack array 30 is preferably implemented in the integrated circuit topography of the microprocessor 12, as known by those skilled in this art, or alternatively provided by way of separate commercially available packaged integrated circuits. Each stack comprises a plurality of memory locations, each of which preferably has the same bit-length as the program counter 16 in order to enable the stack to store a plurality of program counter values, which reference instruction addresses in the program memory 14. The number, n, of stacks is a design choice that depends on the number of anticipated concurrent processes or tasks that the microprocessor can efficiently handle. For example, if it is desired that the microprocessor support multi-tasking between eight different processes or tasks, then the stack array 30 preferably comprises eight stacks. The depth of each stack is also design choice that depends upon how many levels of nesting the microprocessor is designed to handle.

The selection of a particular stack for the transfer of data to and from the program counter 16 is determined by the value or contents of a stack select (SS) register 32 which is connected to a control input of the multiplexer 28; that is, the connection provided by the multiplexer 28 is controlled by the contents of the stack select register 32. The length of the stack select register 32 in terms of the number of bits depends upon the number, n, of stacks in the stack array 30 since the stack select register 32 must be able to identify each stack. Therefore, if there are n stacks, the stack select register 32 preferably comprises at least roundup($1+\log_2(n)$) bits. For example, if there are six stacks, the stack select register 32 preferably comprises at least three bits.

The stack select register 32 is also connected as an input to a decoder 36. Similarly, a control signal 38 from the execution unit 20 is connected as an input to the decoder 36. The control signal 38 instructs the stack array 30 to store the contents of the program counter 16 or to load the program counter with a (top) value from the stack array. The decoder 36 has a plurality of outputs connected to control inputs 40 of the stack array 30, and functions to distribute or route the store/retrieve control signal 38 to the stack control inputs based on the contents of the stack select register 32. Thus, for example, when the execution unit 20 signals that the contents of the program counter 16 should be stored, the control signal 38 is routed to the correct stack in the stack array 30.

The preferred embodiment also contemplates the presence of a native microprocessor instruction for setting the value of the stack select register 32. Accordingly, the execution unit 20 comprises the necessary decoding logic to execute such an instruction. The details of implementing such an instruction will vary depending upon the design and construction of the execution unit 20, but will be known to those skilled in this art.

In operation, the program counter 16 stores the address of the next instruction to be executed by the execution unit 20. The program memory 14 receives this data (i.e., the address of the next instruction to be executed) via the instruction address bus 18, which is connected to the address lines of the program memory 14. Thus, the execution unit 20 fetches and then executes the instruction stored at the location in the program memory 14 indicated by the program counter 16. This data (i.e. the instruction) is transferred over the instruction bus 22 to the execution unit 20. After (or during) an instruction fetch, the execution unit 20 increments the program counter 16 to address the next instruction in the program memory.

However, when the instruction being executed is a subroutine call, the execution unit 20 will cause the contents of the program counter 16 (which represents the next instruction to be executed from the calling instruction thread) to be pushed onto or stored in the stack selected by the stack select register 32, as described above. When the subroutine terminates, the execution unit 20 will cause the program counter 6 to be restored with the instruction address stored at the top of the currently selected stack in stack array 20, thereby continuing the execution of the calling instruction thread from the point at which it was interrupted. This process can be nested to the depth of the stack.

Figure 2:
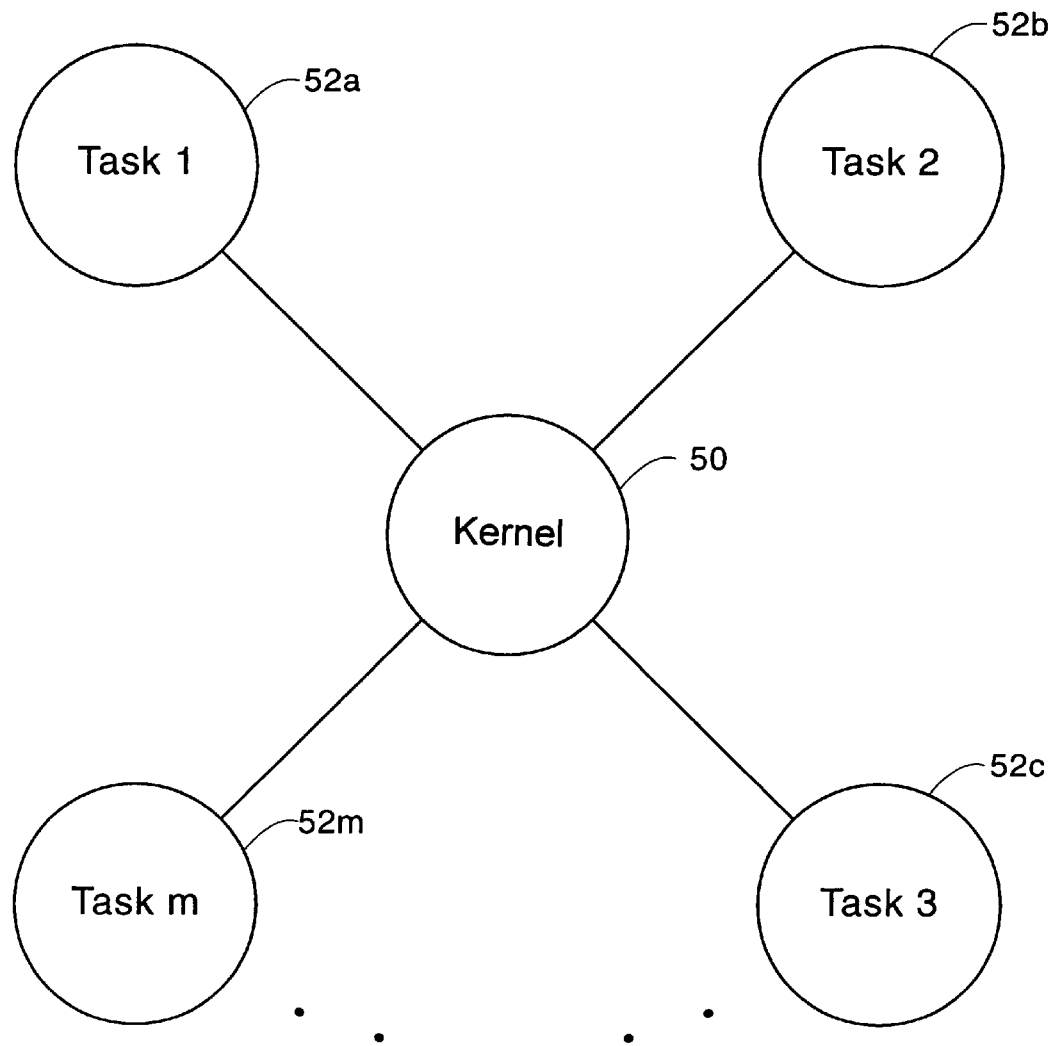
FIG. 2 is a block diagram of a software architecture for implementing multi-tasking capability on the microprocessor shown in FIG. 1.

The effectiveness of the microprocessor architecture shown in FIG. 1 for multi-tasking capability is described with additional reference to the software architecture illustration of FIG. 2. As shown in FIG. 2, a kernel program, as is known in the art, administrates the time slicing of microprocessor 12 amongst m tasks 52a, 52b, . . . 52m. This includes associating each task 52a, 52b, . . . 52m, with one stack in the stack array 30. Preferably, the kernel 50 does not allow more tasks 52 to be spawned than the number n of stacks, i.e. max(m)=n.

The kernel 50 is a compact program which sets the microprocessor 12 to generate a timed interrupt for the time period or window allotted to the current task. When a currently executing task, say 52i, is interrupted because its window has terminated, the kernel 50 must save the state of the microprocessor 12. This includes the state of the program counter 16 and its associated stack. In the microprocessor 12, the kernel 50 accomplishes this function by executing an instruction to store the contents of the program counter 16 onto its associated stack. Then, the kernel 50 sets the stack select register 32 to point to the stack (in array 30) which is associated with the next task, 52(i+1), to be executed by the microprocessor 12. Next, the kernel 50 executes an instruction to load the program counter 16 with the (top) contents of the stack. This will cause the stack associated with task 52(i+1) to re-introduce the previously saved next instruction address to be executed for task 52(i+1) into the program counter 16, after which the task 52(i+1) can continue to be executed from its previously interrupted position. (Status and other context information would be saved explicity using an index register.)

It will be seen from the foregoing that since there are multiple program counter stacks independent of the data memory 24, it is not necessary to access the data memory 24 for the purposes of saving and/or retrieving the program counter and its associated stack when switching from one task to another. Moreover, if the bit-length of the program counter 16 is larger than the width of the data bus 26, the necessity of requiring two instruction cycles to transfer the program counter and its associated stack to and from the data memory 24 is precluded.

Figure 3:
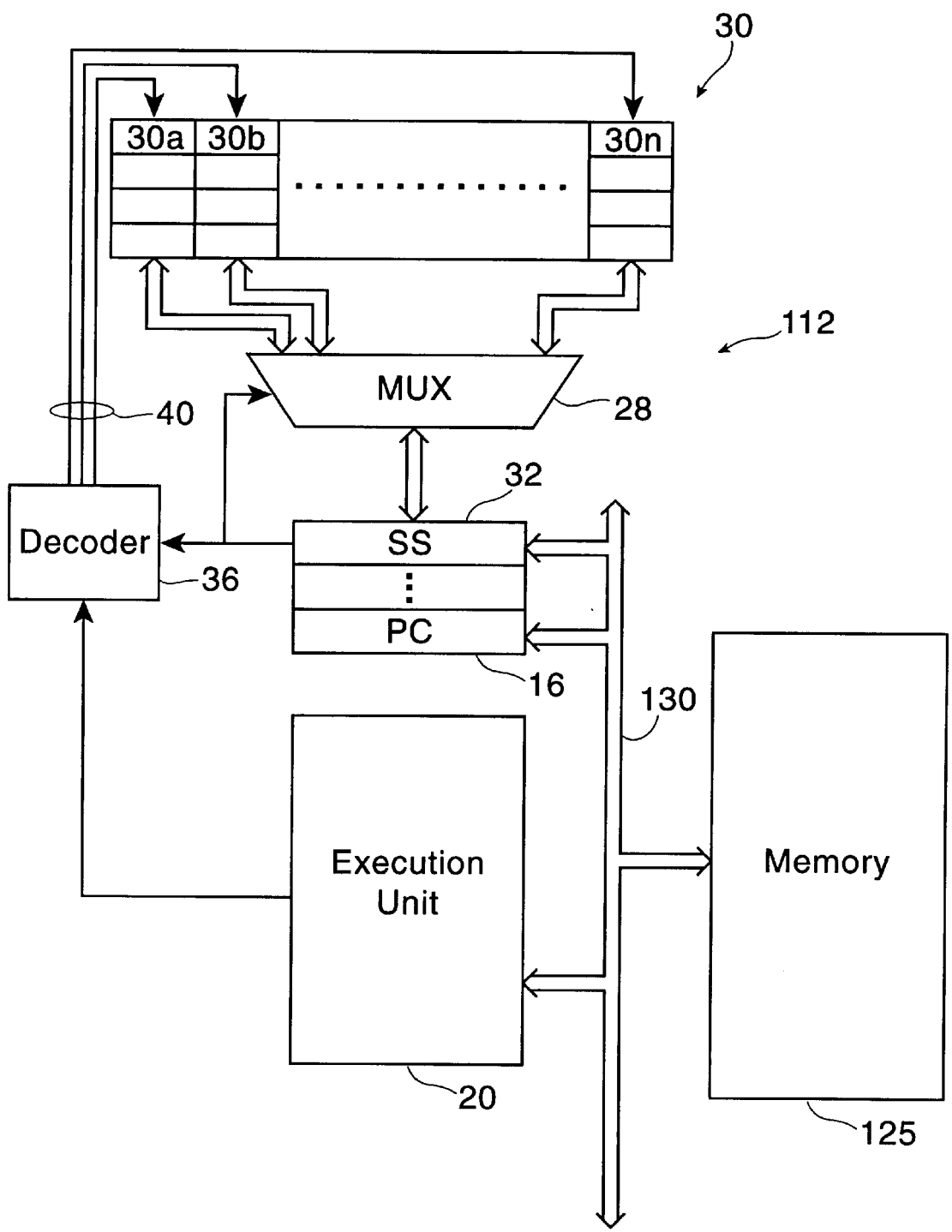
FIG. 3 is a block diagram illustration of a von Neuman-type microprocessor having multiple program counter stacks in accordance with the preferred embodiment.

FIG. 3 illustrates an alternative embodiment of the invention featuring a Von Neuman type microprocessor 112. It is similar to the microprocessor shown in FIG. 1, but features a common program and data memory 125 and a common bus 130 linking the program counter 16, execution unit 20, and memory 125. (For this example, the true Von Neuman architecture has been modified to use a separate stack area.) The microprocessor 112 otherwise behaves as described above. Similarly, those skilled in the art will appreciate that the invention is not limited by what has been particularly shown and described herein as numerous modifications and variations may be made to the illustrated embodiments without departing from the spirit and scope of the invention.

What is claimed is:

1. A central processing unit for processing multiple tasks, comprising:
   at least one memory for storing instructions and data;
   a program counter for storing a program counter value;
   an execution unit for retrieving and processing an instruction located in said memory at an address corresponding to said program counter value;
   a plurality of stacks independent of said memory, wherein each of said plurality of stacks has memory locations for storing program counter values corresponding to one of said multiple tasks;
   a multiplexer for connecting said program counter to each of said plurality of stacks; and
   a stack select register, connected to a control input of said multiplexer, for enabling the transfer of program counter values between said program counter and one of said plurality of stacks as indicated by the contents of said stack select register.

2. The central processing unit according to claim 1, further including a decoder, connected to said stack select register and to a control input of each of said plurality of stacks, for controlling the transfer of data between each of said plurality of stacks and said program counter.

3. The central processing unit according to claim 2, wherein said execution unit generates a stack control signal and said stack control signal is connected to said decoder.

4. The central processing unit according to claim 1, wherein said execution unit comprises means for executing an instruction to set said stack select register.

5. The central processing unit according to claim 1, wherein said stack is a last-in, first-out memory structure.

6. The central processing unit according to claim 1, wherein said at least one memory comprises a separate program memory unit and a separate data memory unit, said program memory unit being connected to said execution unit by an instruction bus and said data memory unit being connected to said execution unit by a data bus.

7. The central processing unit according to claim 1, wherein said at least one memory consists of a single randomly accessible memory connected to said execution unit by a common bus.

8. The central processing unit according to claim 1, wherein said execution unit is operative to automatically push the contents of the program counter onto one of said stacks selected by said stack select register.

9. A data processor for processing multiple tasks, comprising:
   memory means for storing instructions and data;
   a program counter for storing a program counter value;
   instruction execution means for retrieving and processing an instruction located in said memory means at an address corresponding to said program counter value;
   means having a plurality of stacks, wherein each of said plurality of stacks has memory locations for storing program counter values corresponding to one of said multiple tasks independent of said memory means;
   multiplexer means for connecting said program counter to each of said plurality of stacks; and
   stack select means, connected to a control input of said multiplexer means, for enabling the transfer of program counter values between said program counter and one of said plurality of stacks as indicated by the contents of said stack select means.

10. The central processing unit according to claim 9, further comprising decoder means connected to said stack select means and to said means having a plurality of stacks, for controlling the transfer of data between each of said plurality of stacks and said program counter.

11. A central processing unit according to claim 9, wherein said instruction execution means generates a stack control signal and said signal is connected to said decoder means.

12. A central processing unit according to claim 9, wherein said instruction execution means includes means for executing an instruction to set said stack select means with a specified value.

13. A central processing unit according to claim 9, wherein said stack is a last-in, first-out memory structure.

14. A central processing unit for processing multiple tasks, comprising:
   memory for storing instructions associated with each of said multiple tasks;
   a program counter for storing program counter values associated with said instructions for said multiple tasks;
   a plurality of stacks, each of said plurality of stacks being respectively associated with each of said multiple tasks for storing values for said program counter;
   an execution unit for retrieving and processing an instruction located in said memory at an address corresponding to said program counter;
   a multiplexer for connecting said program counter to each of said stacks; and
   a stack select register, connected to a control input of said multiplexer, for enabling the transfer of program counter values between said program counter and one of said plurality of stacks as indicated by the contents of said stack select register.

15. A central processing unit as claimed in claim 14 wherein said plurality of stacks comprise last-in-first-out (LIFO) stacks.

16. The central processing unit according to claim 14 further comprising second memory for storing data, said second memory being accessible by said execution unit independently of said memory for storing instructions.

* * * * *